United States Patent

Yamamoto et al.

[11] Patent Number: 5,289,893
[45] Date of Patent: Mar. 1, 1994

[54] STEERING CONTROL APPARATUS

[75] Inventors: Junji Yamamoto, Toyoake; Yoshinobu Suzuki, Kariya; Atsushi Takumi, Nagoya, all of Japan; Takashi Omitsu, Ann Arbor, Mich.; Noriaki Hattori, Anjo; Hideki Kusunoki, Toyota, both of Japan

[73] Assignees: Aisin Seiki Kabushiki Kaisha, Kariya; Toyota Jidosha Kabushiki Kaisha, Toyota, both of Japan

[21] Appl. No.: 942,198

[22] Filed: Sep. 9, 1992

[30] Foreign Application Priority Data

Sep. 10, 1991 [JP] Japan .................. 3-229926

[51] Int. Cl.5 .............................. B62D 6/00
[52] U.S. Cl. ................... 180/132; 180/141; 180/142; 180/146; 180/147; 364/424.05
[58] Field of Search ............ 180/132, 141, 142, 143, 180/147, 148, 146; 364/424.05

[56] References Cited

U.S. PATENT DOCUMENTS 4,871,040 10/1989 Zuraski et al. ................ 180/142
4,886,138 12/1989 Graber et al. ................. 180/142
4,941,097 7/1990 Karnopp et al. .............. 364/424.05
5,156,229 10/1992 Yasui et al. .................. 180/140
5,519,553 10/1992 Karnopp et al. .............. 364/424.05

Primary Examiner—Mitchell J. Hill
Attorney, Agent, or Firm—Burns, Doane, Swecker & Mathis

[57] ABSTRACT

The invention is directed to an arrangement for providing an automatic steering control and restraining a steering wheel from being rotated in case of the automatic steering control. A rack is mounted on the vehicle to be laterally movable with respect thereto and linked to a main shaft of a steering wheel. A lateral shaft is disposed to be laterally movable with and with respect to the rack and linked at its opposite ends to steerable wheels of the vehicle. Relative positions of the rack and lateral shaft are adjusted by an adjusting device. An electromagnetic clutch is disposed to restrain at least one of the rack and the main shaft from being moved with a frictional force applied thereto in case of the automatic steering control. Consequently, the steering wheel is not rotated in the automatic steering control, while the steering wheel can be rotated manually against the frictional force.

19 Claims, 6 Drawing Sheets

STEERING CONTROL APPARATUS

BACKGROUND OF THE INVENTION

1. Field of the Invention

The present invention generally relates to an apparatus for steering a vehicle, and more particularly to a mechanism for providing additional steering or fully automatic steering to steerable wheels of the vehicle.

2. Description of the Prior Art

During vehicle motion, such as cornering, for example, vehicle handling dynamics are affected by various parameters such as road conditions, tire characteristics, weight distribution, braking, accelerating, and the like, which can lead to oversteer or understeer conditions. In an effort to deal with this problem and attempt to maintain vehicle handling dynamics constant, there has been heretofore proposed an adaptive steering control system employing complex suspension link systems, drive train arrangements, and braking systems. In Japanese Patent Laid-open Publication No. 2-106468 which corresponds to the U.S. Pat. No. 4,941,097, there has been proposed an apparatus linked to a steering mechanism for detecting a yaw rate of the vehicle and providing additional control of steering amount in response to the yaw rate.

In the case where an automatic steering control is provided by linking a fluid pressure motor or an electric motor to a conventional steering mechanism, when the automatic steering control is initiated, a steering wheel will be rotated automatically in accordance with a determined steering amount, without manipulation by a vehicle driver. It is preferable that the steering wheel is not rotated unless the vehicle driver manipulates the steering wheel, even in case of the automatic steering control.

In the conventional steering mechanism, a steering shaft, which is rotated in accordance with rotation of the steering wheel, is provided at its tip end with a pinion which meshes with teeth on a rack laterally disposed to be axially movable. Connected to opposite ends of the rack are tie rods which are connected to steering axes of the steerable wheels, respectively. Therefore, if a sub-axial member, similar to the rack for example, is disposed between the rack and each tie rod, and a driving mechanism for adjusting the relative positions of the rack and the sub-axial member is disposed so as to provide the automatic steering control, then it is possible to move the tie rods without rotating the steering wheel to thereby provide the automatic steering control. However, when a reaction force created in the steering control is large, the reaction force can be transmitted to the steering shaft through the sub-axial member and the rack to rotate the steering wheel.

SUMMARY OF THE INVENTION

Accordingly, it is an object of the present invention to provide an automatic steering control in addition to a manual steering control, and prevent a steering wheel from being rotated in case of the automatic steering control.

In accomplishing the above and other objects, the present invention is directed to a vehicle steering apparatus for providing an automatic steering control to steerable wheels of a vehicle. The apparatus includes a first steering member mounted on the vehicle so as to be laterally movable with respect to the vehicle, and a second steering member disposed so as to be laterally movable with and with respect to the first steering member. The second steering member is linked at its opposite ends to the steerable wheels of the vehicle for causing steering rotation of the steerable wheels. A steering input mechanism is linked to the first steering member for steering the steerable wheels. The apparatus further includes an adjusting device which adjusts the relative positions of the first steering member and the second steering member, and a restraining mechanism for restraining movement of at least one of the steering input mechanism and the first steering member, in relation to the vehicle.

Preferably, the apparatus further includes a fixed member secured to the vehicle, and the restraining mechanism preferably includes a friction member for linking one of the steering input mechanism and the first steering member to the fixed member with a frictional force applied therebetween.

The apparatus may further include an automatic steering control unit which selects one of an automatic steering mode and a manual steering mode, and actuates the adjusting device in accordance with the selected control mode. The steering input mechanism includes a main shaft and a steering wheel mounted thereon for rotating the main shaft therewith. The restraining mechanism may comprise a frame mounted on the fixed member, a rotating member mounted on the main shaft in opposed relationship with the frame for rotating together with the main shaft, an electromagnetic clutch for selectively taking one of a first position of the rotating member engaged with the frame and a second position of the rotating member disengaged therefrom. The automatic steering control unit controls the electromagnetic clutch to take the first position when the automatic steering mode is selected, and take the second position when the manual steering mode is selected.

BRIEF DESCRIPTION OF THE DRAWINGS

The above stated objects and following description will become readily apparent with reference to the accompanying drawings, wherein like reference numerals denote like elements, and in which.

DESCRIPTION OF THE PREFERRED EMBODIMENTS

Figure 1:
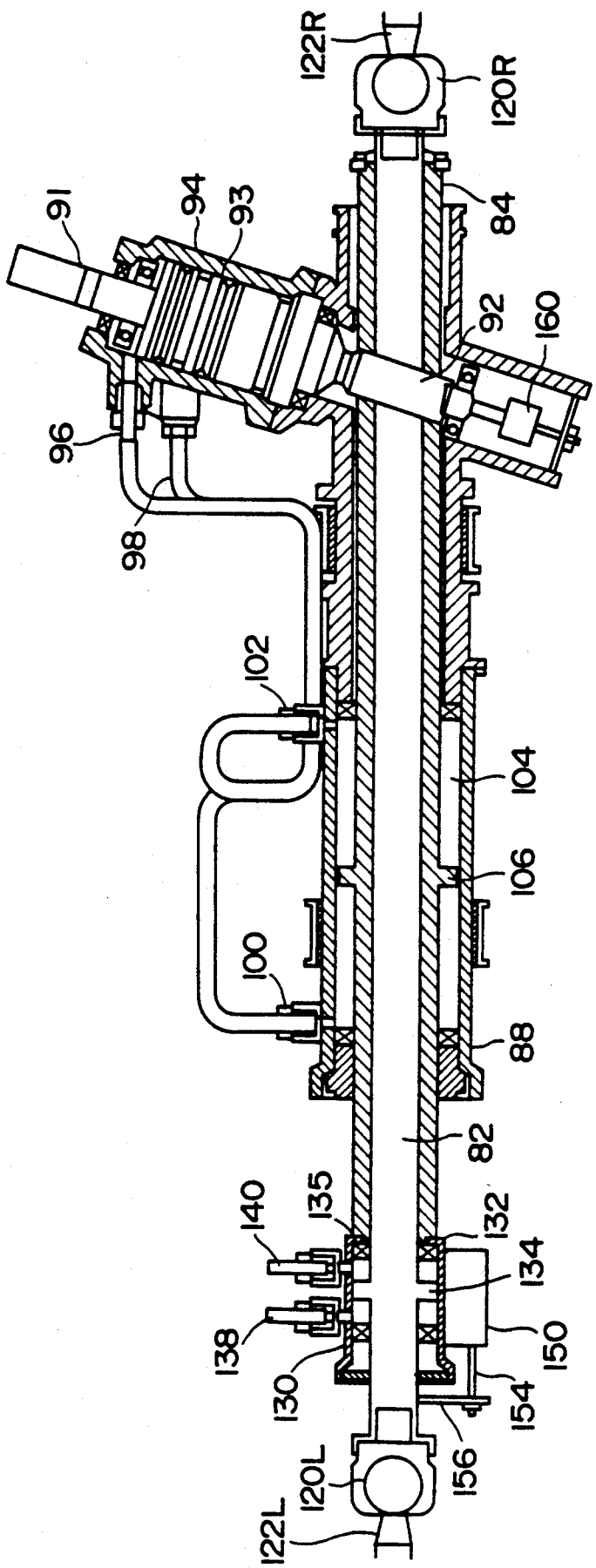
FIG. 1 is a longitudinal sectional view of a part of a steering mechanism in accordance with an embodiment of the present invention.
Figure 2:
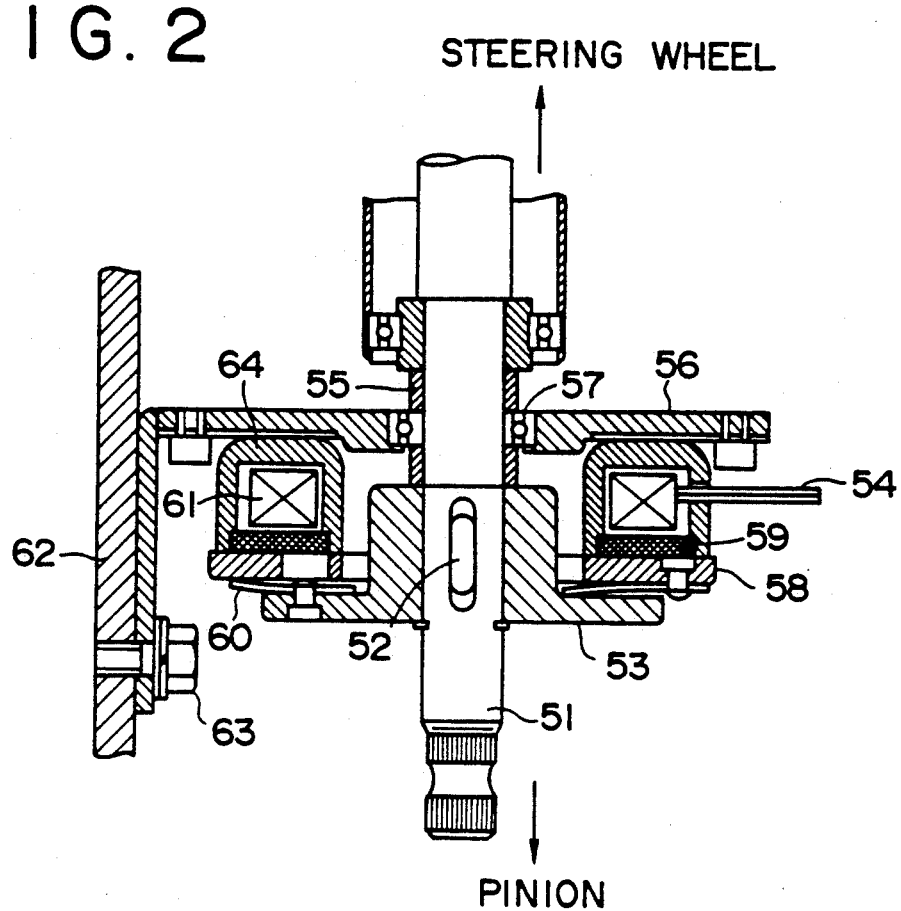
FIG. 2 is a sectional view of a restraining mechanism of an embodiment of the present invention.

Referring to FIGS. 1 and 2, there is illustrated a steering mechanism for a vehicle. Depicted in FIG. 2 is a part of the mechanism which is disposed in a steering column (not shown). A main shaft 51 is linked at its upper end to a steering wheel (not shown), and linked at its lower end to an input shaft 91 shown in FIG. 1 through an intermediate shaft (not shown) for linking therebetween. It is so arranged that, when the steering wheel is steered by a vehicle driver, the main shaft 51 rotates to transmit its rotational force to the input shaft 91. The steering mechanism depicted in FIG. 1 is provided with a power steering system which is known in the art.

The steering mechanism depicted in FIG. 1 is of the rack and pinion type wherein the input shaft 91 carries a pinion 92 which meshes with teeth on a reciprocable longitudinal rack 84. The rack 84 is eccentrically arranged relative to the pinion 92, with the teeth formed on its outer circumference. According to the present embodiment, the rack is formed in the form of a hollow cylinder wherein a lateral power shaft 82 is axially slidably mounted. Connected to the right end of the lateral power shaft 82 is a tie rod 122R through a ball joint 120R. Axial displacement of the tie rod 122R in either direction produces a steering of a right front wheel (not shown). Likewise, connected to the left end of the lateral power shaft 82 is a tie rod 122L through a ball joint 120L, so that axial displacement of the tie rod 122L in either direction produces a steering of a left front wheel (not shown).

The lateral power shaft 82 and rack 84 can be axially moved relatively to each other, and disposed therebetween is a fluid actuator 130 which produces the relative movement or prohibits it to thereby enable an automatic steering control. The fluid actuator 130 includes a cylinder 132 connected to the left end of the rack 84 and the piston 134 integrally formed with the lateral power shaft 82. A piston 134 is axially slidably disposed within the cylinder 132. Communicating with chambers formed on opposite sides of the piston 134 in the cylinder 132 are fittings 138, 140 which are connected to a fluid circuit described hereinafter. When the cylinder 132 is filled with a pressurized fluid to prevent the fluid from being introduced into and discharged from the cylinder 132 through the fittings 138, 140, the piston 134 is restrained from moving in the cylinder 132. Thus, substantially no relative movement is caused between the lateral power shaft 82 and the rack 84, so that the movement of the rack 84 is directly transmitted to the lateral power shaft 82. Consequently, by rotating the steering wheel (not shown) as in a conventional steering apparatus, the main shaft 51 and the intermediate shaft are rotated to rotate the pinion 92, whereby the rack 84 is moved axially so that lateral power shaft 82 linked thereto through the fluid actuator 130 is moved to steer the steerable wheels.

In the case where the steering wheel is not rotated, when the piston 134 is moved in the cylinder 132 by controlling the fluid circuits, the lateral power shaft 82 is moved relative to the rack 84 to thereby steer the steerable wheels. Thus, by operating the fluid actuator 130, it is possible to provide an additional steering for assisting the operation of the steering wheel, or provide a fully automatic steering control.

When the fully automatic steering control is provided, the steering wheel is free from manipulation. Therefore, if a large reaction force is created against a steering force, the reaction force is transmitted to the steering wheel through the lateral power shaft 82, fluid actuator 130, rack 84, main shaft 51 and the like, whereby the steering wheel is rotated reversely by the reaction force to thereby lessen the steered amount comparing with its desired value. In the present embodiment, therefore, there is provided a mechanism for restraining rotation of the steering wheel in case of automatic steering control.

Depicted in FIG. 2 is the restraining mechanism, wherein a plate-like stay 56 is mounted on a fixed member 62 of the steering column by means of a screw 63 to support the main shaft 51 rotatably around a bearing 57. A rotor 53 made in the form of a circular plate is supported so as to maintain a certain clearance against the stay 56 with a spacer 55 disposed therebetween, and fixed to the main shaft 51 by a key 52. Around the periphery of a small-diameter portion of the rotor 53, disposed is a movable plate 58 made from magnetic substance in the form of a circular ring. The movable plate 58 is linked to the rotor 53 through a leaf spring 60 which is secured to the rotor 53 and the movable plate 58 respectively by caulking rivets thereto. A coil 61 is disposed inside of a frame 64 which is secured to the underside of the stay 56, and leads 54 are drawn from the coil 61. A friction member 59 made in the form of a circular ring is mounted on a surface of the frame 64 facing with the movable plate 58. In this embodiment, therefore, the stay 56 serves as a base member, the rotor 53 serves as a rotating member, and the leaf spring 60 serves as the lining member according to the present invention, respectively.

When an electric current is not fed to the coil 61, the movable plate 58 is forced to be drawn toward a large-diameter portion (lower side in FIG. 2) of the rotor 53 by means of the biasing force of the leaf spring 60, so that the movable plate 58 is positioned away from the friction member 59. In this condition, therefore, the main shaft 51 is freely rotatable. When the current is fed to the coil 61, the movable plate 58 of magnetic substance is forced to be drawn toward the coil 61 (upper side in FIG. 2), so that the movable plate 58 contacts with the friction member 59 and is held in that condition. Consequently, the movable plate 58 is restrained from rotating, so that the rotor 53 and main shaft 51 are also restrained from rotating. Thus, by means of the frictional force, the main shaft 51 is effectively restrained from rotating against the reaction force caused by steering operation. Since the restraining force is not so large, however, the movable plate 58 can be moved relative to the friction member 59, even in the case where the current is fed to the coil 61, by rotating the steering wheel with a relatively large rotating force for emergency purpose or the like.

Figure 5:
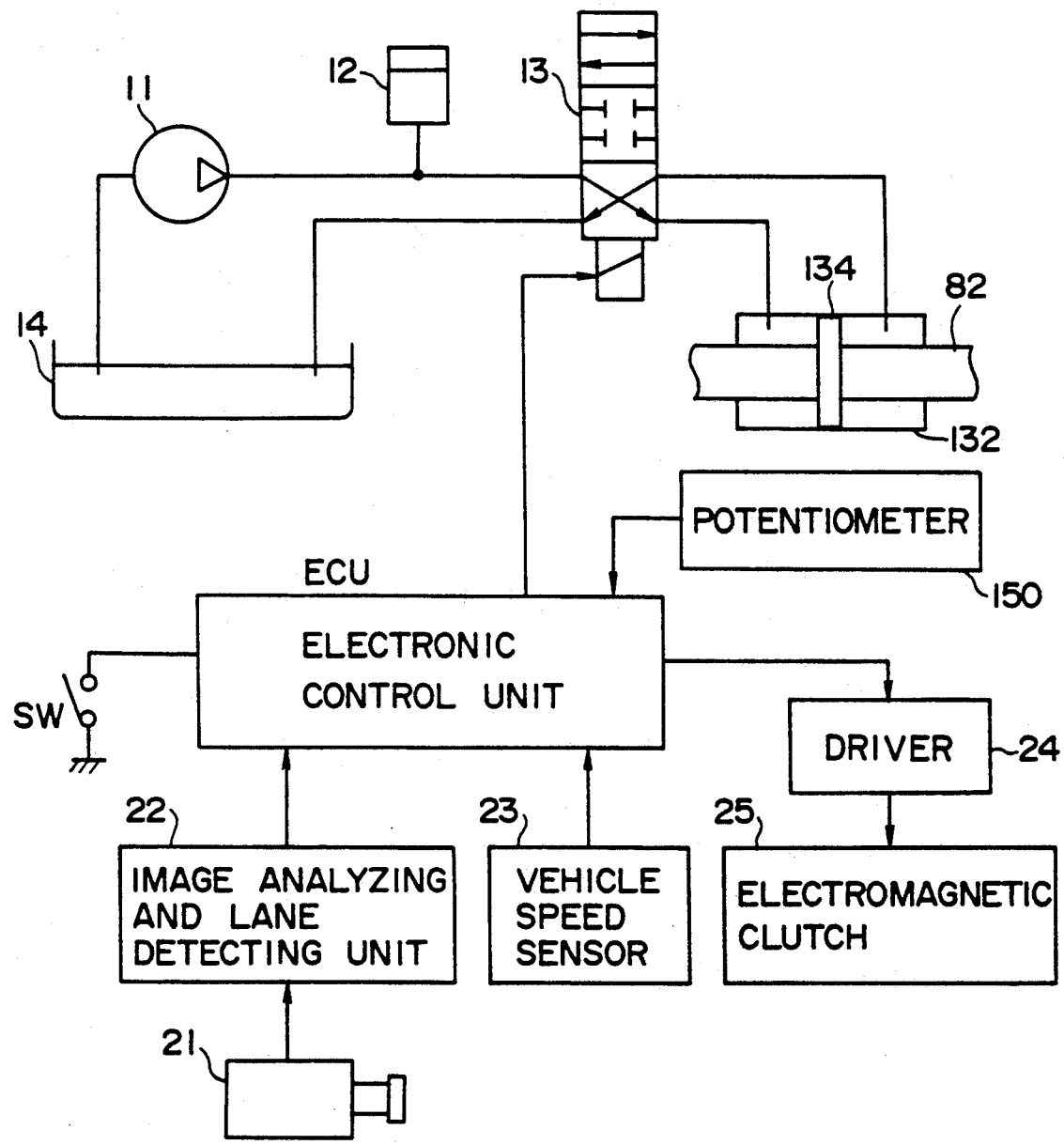
FIG. 5 is a block diagram of a fluid circuit and electric circuit according to an embodiment.

FIG. 5 schematically illustrates the electric circuit and fluid circuit for controlling the above-described steering mechanism. The fluid circuits includes a fluid pump 11, accumulator 12, tri-positional solenoid valve or three-way changeover solenoid valve 13 and reservoir 14. The three-way solenoid valve 13 is so arranged that when it is positioned in its first state, a pressurized fluid is fed from the pump 11 to the right chamber of the cylinder 132, and a fluid in the left chamber thereof is drained to the reservoir 14, so that the piston 134 is forced to move leftward in FIG. 5. When the solenoid valve 13 is positioned in its second state, the pressurized fluid is fed from the pump 11 to the left chamber of the cylinder 132, and the fluid in the right chamber thereof is drained to the reservoir 14, so that the piston 134 is forced to move rightward in FIG. 5. When the solenoid valve 13 is positioned in its third state, the cylinder 132 is prevented from introducing and discharging the fluid, so that the position of piston 134 is held.

The relative displacement between the rack 84 and lateral power shaft 82 caused in accordance with a position of the piston 134 is detected by a potentiometer 150. As shown in FIG. 1, the potentiometer 150 is mounted on the cylinder 132. Since a tip end of the rod 154 is linked to an arm 156 which is secured to the lateral power shaft 82, a value representing the relative displacement between the rack 84 and lateral power shaft 82 is detected by the potentiometer 150.

Referring back to FIG. 5, the electric circuit will be explained. The present embodiment is provided with an automatic steering mode, wherein a vehicle is steered automatically along a predetermined lane, on a free way for example, without rotating the steering wheel. In the automatic steering mode, an image in front of the vehicle substantially corresponding to a driver's view is taken by a TV camera 21 and repeatedly input thereinto. The input image is analyzed by an image analyzing and lane detecting unit 22, so that a relative position between the vehicle and the lane, and a direction of fore lane are detected for use of steering control. An electronic control unit ECU is provided with a central processing unit for determining a direction to be steered and a steering amount on the basis of data output from the image analyzing and lane detecting unit 22 and a vehicle speed output from the vehicle speed sensor 23, and activating the three-way solenoid valve 13 in accordance with the steering amount to automatically control the steering system. In the automatic steering mode, an electromagnetic clutch 25, which corresponds to the restraining mechanism depicted in FIG. 2, is also controlled to restrain rotation of the steering wheel. The electromagnetic clutch 25 is controlled by the electronic control unit ECU through a driver 24. A switch SW is connected to the electronic control unit ECU to set or reset the automatic steering mode.

Figure 8:
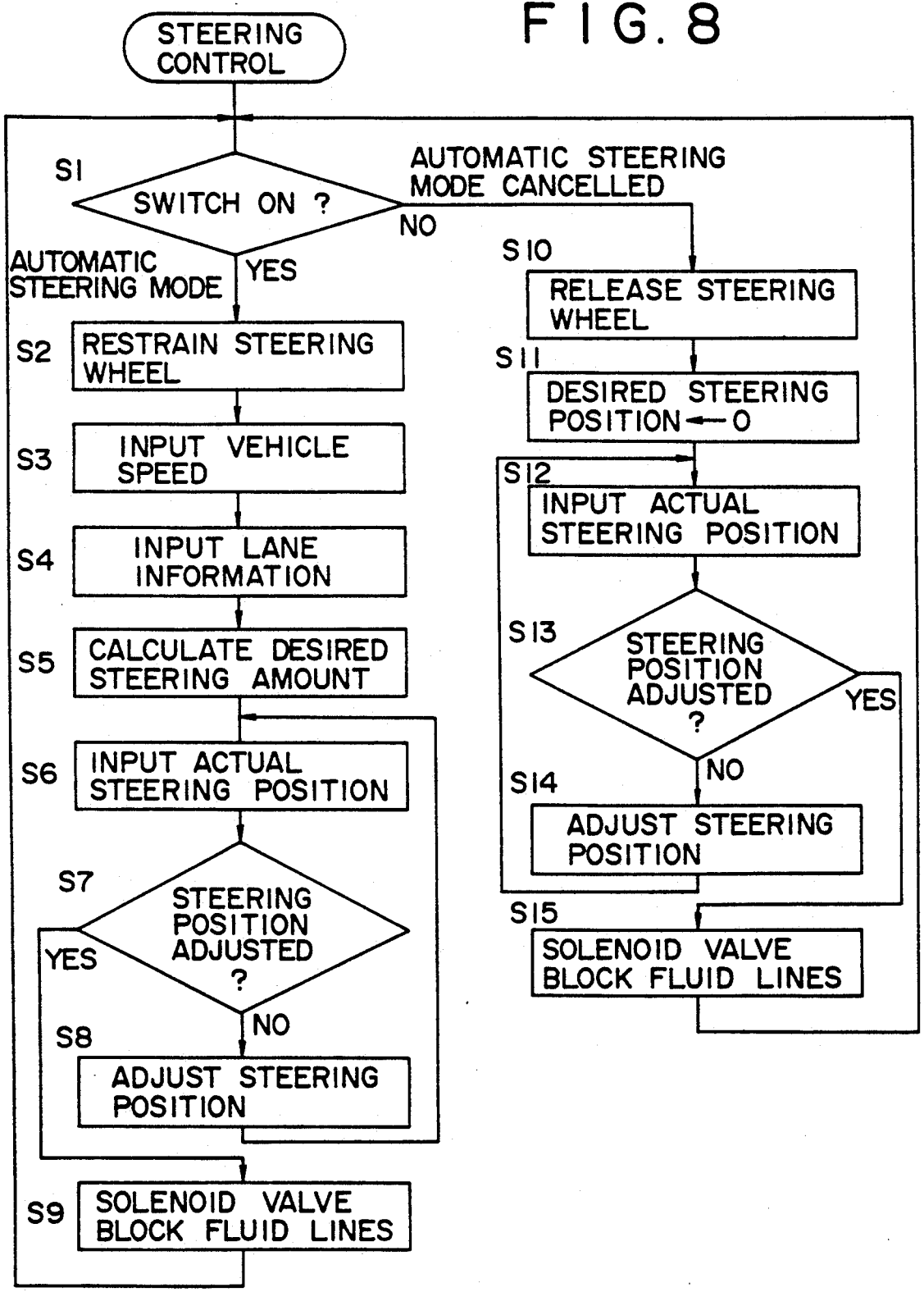
FIG. 8 is a flow chart showing the operation of an embodiment.

A program routine executed by the electronic control unit ECU will be described with reference to a flow chart shown in FIG. 8. At the outset, the state of switch SW, i.e., whether the automatic steering mode is set or not, is determined at Step S1. If it is determined that the automatic steering mode is set, the program proceeds to Step S2, otherwise it proceeds to Step S10. When the automatic steering mode is set, the electromagnetic clutch 25 is energized by feeding the current to the coil 61 at Step S2, so that the rotation of steering wheel is restrained. Then, the vehicle speed is input from the vehicle speed sensor 23 at Step S3, the lane information is input from the image analyzing and lane detecting unit 22 at Step S4, and a desired steering amount is calculated on the basis of the input informations at Step S5. Next, at Step S6, an actual steering position is input by the output from the potentiometer 150, and the actual steering position is compared with the desired steering position at Step S7. When the actual steering position is different from the desired steering position, the program proceeds to Step S8 where the steering position is adjusted by controlling the three-way solenoid valve 13 to adjust the position of the piston 134. The steering position is continued to be adjusted until the actual steering position coincides with the desired steering position. When the actual steering position coincides with the desired steering position, the three-way solenoid valve 13 is set to its state for blocking the fluid lines at Step S9, so that the position of the piston 134 is fixed.

When the automatic steering mode is not set, the electromagnetic clutch 25 is deenergized without the current fed to the coil 61 at Step S10 to set the desired steering position to be zero (i.e., set to the center) at Step S11, and the Steps S12, S13 and S14 are repeated until the desired steering position is observed. When the steering position is returned to the center, the three-way solenoid valve 13 is set to its state for blocking the fluid lines at Step S15, so that the position of the piston 134 is fixed.

In general, a coil of wire is heated by feeding an electric current thereto, so that an ohmic value of the coil is varied. Since the current fed to the coil 61 for the electromagnetic clutch 25 is varied in accordance with a lapse of time, a restraining torque created by the clutch 25 is varied in accordance with a lapse of time as shown in FIG. 7. With respect to this restraining torque, if it is too small, the steering wheel might be rotated by the reaction force caused in the automatic steering mode, whereas if it is too large, a large force is required for rotating the steering wheel manually in case of emergency. According to the present embodiment, therefore, the driver 64 for controlling energization of the clutch 25 is provided as shown in FIG. 6.

Figure 6:
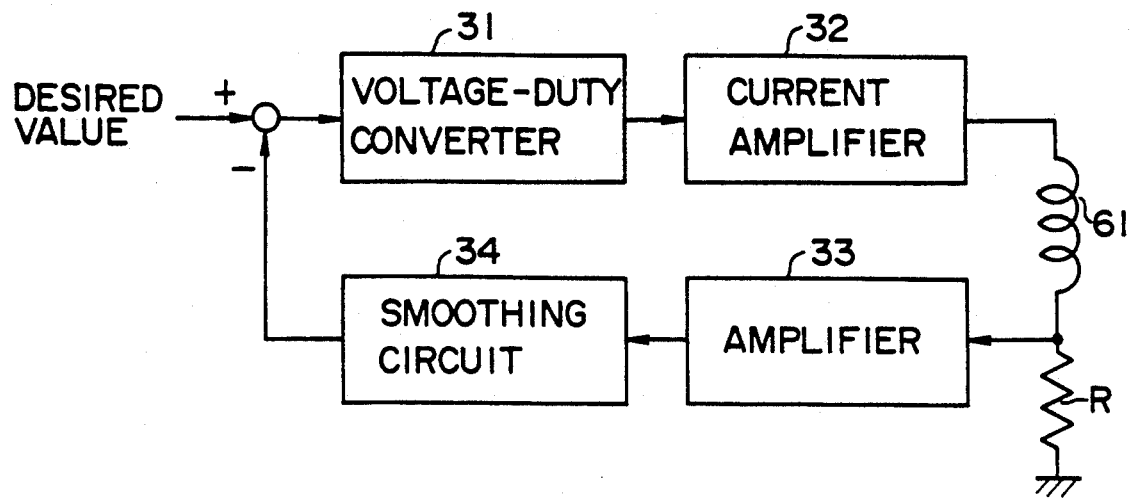
FIG. 6 is a block diagram showing the construction of a driver as shown in FIG. 5.
Figure 7:
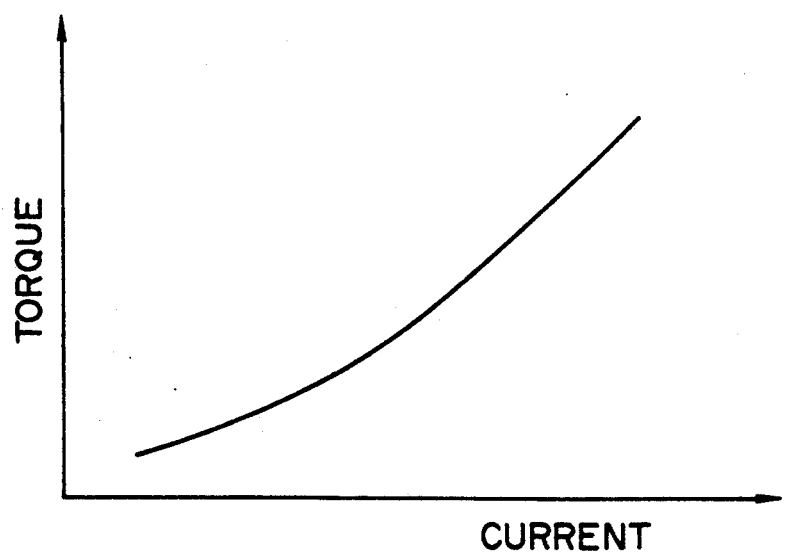
FIG. 7 is a diagram showing a relationship between electric current and restraining torque.

Referring to FIG. 6, a desired value is output from the electronic control unit ECU. A voltage-duty converter 31 is arranged to produce a pulse signal of a constant period, and vary its duty (on/off rate) in response to a level of an input voltage. An output signal of the voltage-duty converter 31 is fed to the coil 61 for the clutch 25 through a current amplifier 32. Therefore, an average value of the current fed to the coil 61 varies in proportion to the duty of the pulse signal output from the voltage-duty converter 31. A voltage created between opposite terminals of a resistor R, which is connected in series to the coil 61, is proportional to the value of current fed to the coil 61. This voltage is amplified by an amplifier 33 and smoothed by a smoothing circuit 34, and then fed back to the voltage-duty converter 31. Accordingly, when the average of the current fed to the coil 61 is smaller than the desired value, the pulse duty is enlarged to increase the current, whereas when the average of the current fed to the coil 61 is larger than the desired value, the pulse duty is lessened to decrease the current, so that the current fed to the coil 61 is controlled to reach the desired value. As a result, even if the coil 61 is heated to vary its ohmic value, the restraining torque is not varied.

In the above-described embodiment which is applied to an ordinary vehicle mainly steered manually by a driver, the steering mechanism is arranged to automatically prevent the steering wheel from being restrained when the automatic steering mode is not set. On the contrary, in the case where the vehicle is mainly steered automatically, and steered manually in a temporary case such as emergency purpose or the like, the steering mechanism may be arranged to normally restrain the steering wheel. For this purpose, in lieu of the electromagnetic clutch 25 as depicted in FIG. 2, there may be employed a restraining mechanism for mechanically restraining the rotation of the steering wheel as depicted in FIGS. 3 and 4.

Figure 3:
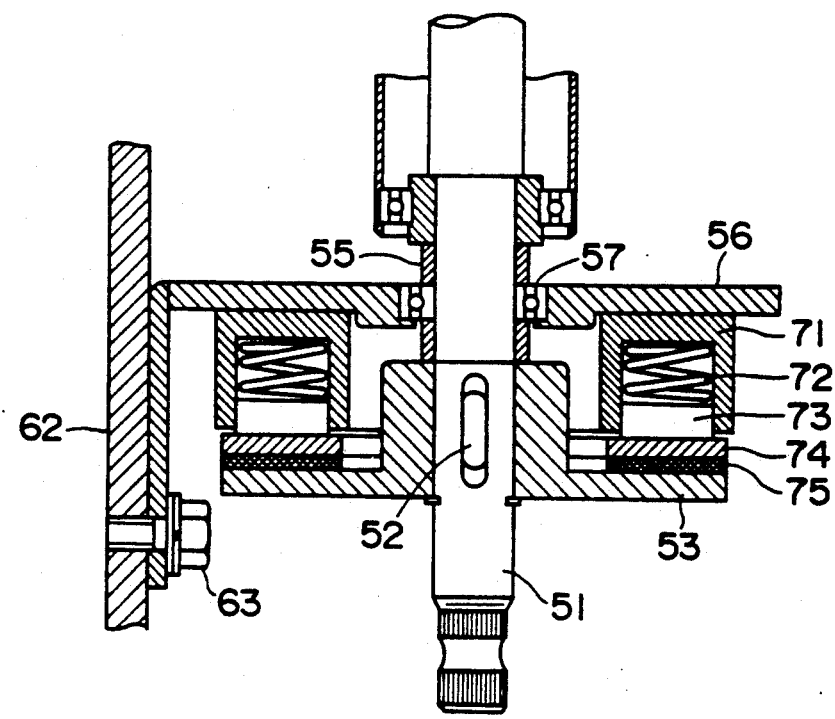
FIG. 3 is a sectional view of a restraining mechanism of another embodiment.
Figure 4:
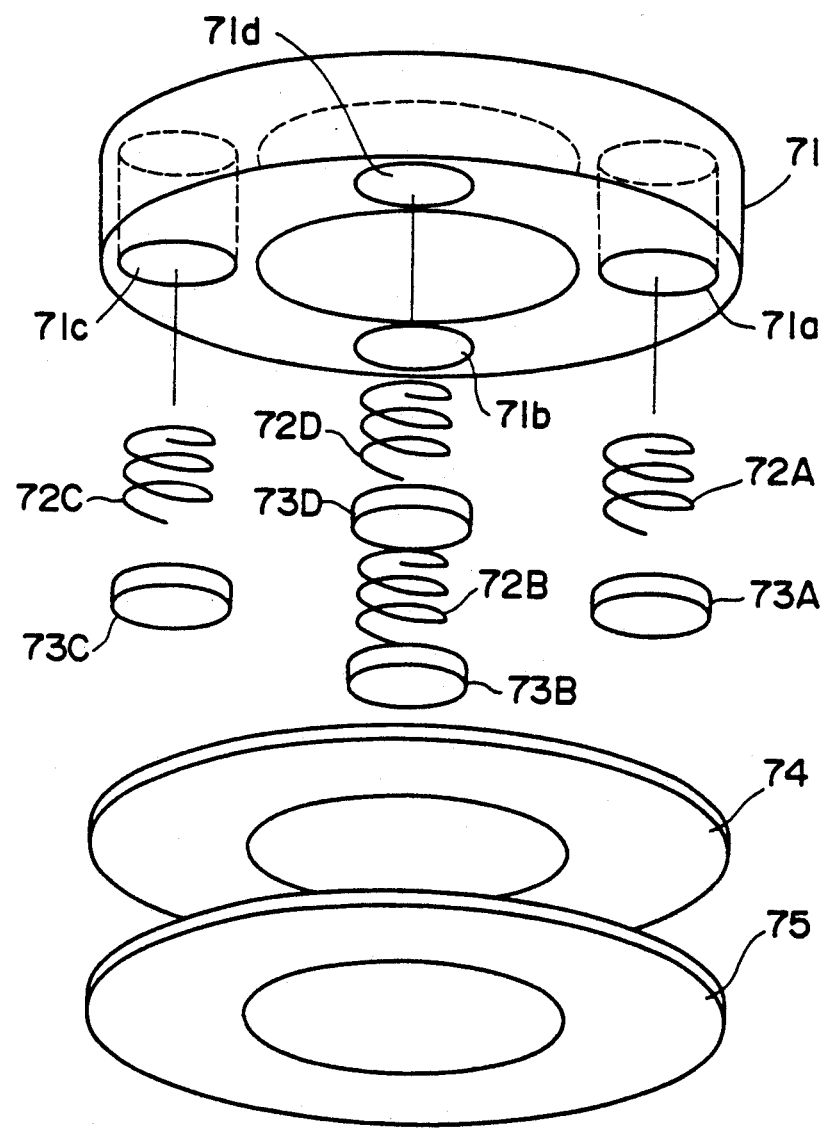
FIG. 4 is a perspective view of a part of the mechanism as shown in FIG. 3.

In FIGS. 3 and 4, the plate-like stay 56 is mounted on the fixed member 62 of the steering column by means of the screw 63 to support the main shaft 51 rotatably around the bearing 57. The rotor 53 made in the form of a circular plate is supported so as to maintain a certain clearance against the stay 56 with the spacer 55 disposed therebetween, and fixed to the main shaft 51 by the key 52. A circular member 71 is secured to the underside of the stay 56 and formed with a plurality of cylinders 71a, 71b, 71c and 71d, in which compressed coil spring 72A, 72B, 72C, 72D and pistons 73A, 73B, 73C, 73D are disposed respectively.

Below the member 71 is disposed a movable plate 74 made in the form of a circular plate, to which a friction member 75 is adhered. With the compressed coil springs 72A, 72B, 72C, 72D pressing the movable plate 74 downward through the pistons 73A, 73B, 73C, 73D, the friction member 75 is normally pressed toward the large-diameter portion of the rotor 53 to cause a frictional force between the friction member 75 and the rotor 73. Therefore, the rotor 53 is normally prevented from rotating to restrain the main shaft 51 and steering wheel.

Although the invention has been described in connection with preferred embodiments thereof, it will be appreciated by those skilled in the art that additions, substitutions, modifications, and deletions not specifically described, may be made without departing from the spirit and scope of the invention as defined in the appended claims.

What is claimed is:

1. A vehicle steering apparatus for providing automatic steering control to steerable wheels of a vehicle, said apparatus comprising:
   a first steering member mounted on the vehicle for lateral movement with respect to the vehicle;
   a second steering member disposed for lateral movement with and with respect to said first steering member, said second steering member being linked at opposite ends to the steerable wheels of the vehicle for causing steering rotation of the steerable wheels;
   steering input means linked to said first steering member for steering the steerable wheels;
   adjusting means for adjusting the relative positions of said first steering member and said second steering member; and
   restraining means for restraining movement of at least one of said steering input means and said first steering member in relation to the vehicle.

2. The apparatus recited in claim 1 further comprising a fixed member secured to said vehicle, said restraining means including means for linking one of said steering input means and said first steering member to said fixed member with a frictional force applied therebetween.

3. The apparatus recited in claim 2, said steering input means including a main shaft and a steering wheel mounted thereon for rotating said main shaft therewith, said restraining means comprising a base member mounted on said fixed member, a rotating member mounted on said main shaft in opposed relationship with said base member for rotating together with said main shaft, and friction means disposed between said rotating member and said base member for linking said rotating member to said base member with a frictional force applied therebetween.

4. The apparatus recited in claim 3, said friction means including a friction member made of frictional material and disposed between said rotating member and said base member, and biasing means mounted on one of said rotating member and said base member for biasing said friction member toward the other one of said rotating member and said base member.

5. The apparatus recited in claim 4, said biasing means including a piston slidably mounted on one of said rotating member and said base member, and a spring mounted thereon for biasing said piston toward said friction member.

6. The apparatus recited in 2, further comprising automatic steering control means for selecting one of an automatic steering mode and a manual steering mode, and actuating said adjusting means in accordance with the selected control mode, said steering input means including a main shaft and a steering wheel mounted thereon for rotating said main shaft therewith, said restraining means comprising a frame mounted on said fixed member, a rotating member mounted on said main shaft in opposed relationship with said frame for rotating together with said main shaft, electromagnetic clutch means for selectively taking one of a first position in which said rotating member is engaged with said frame and a second position in which said rotating member is disengaged from the frame, said automatic steering control means controlling said electromagnetic clutch means to take the first position when the automatic steering mode is selected and take the second position when the manual steering mode is selected.

7. The apparatus recited in claim 6, said electromagnetic clutch means including a coil disposed on said frame, a movable plate axially movably mounted on said rotating member for rotating together therewith, and a friction member made of frictional material and secured to one of said frame and said movable plate in opposed relationship with the other one of said frame and said movable plate, and a linking member for movably linking said movable plate to said rotating member in the axial direction of said main shaft to rotate said movable plate together with said rotating member.

8. The apparatus recited in claim 7, said linking member comprising a leaf spring connected to said rotating member at one end of said spring and connected to said movable plate at the other end of said spring.

9. The apparatus recited in claim 7, the apparatus further comprising means for controlling electric current fed to said coil to maintain a desired value of the current.

10. The apparatus recited in claim 9, said automatic steering control means comprising a central processing unit, said means for controlling electric current comprising an electrically driven driver, said central processing unit actuating said adjusting means in accordance with the selected control mode and actuating said driver to selectively activate said electromagnetic clutch means.

11. The apparatus recited in claim 10, said driver comprising a voltage-duty converter connected to said central processing unit for receiving a voltage signal representing said desired value of the current and producing a pulse signal of a duty varied in accordance with said voltage signal, a current amplifier connected to said converter for feeding said coil with the current varied in proportion to the duty of said pulse signal, and a feed back circuit for connecting an output terminal of said coil to an input terminal of said converter.

12. A vehicle steering apparatus for automatic steering control to steerable wheels of a vehicle, said apparatus comprising:
   a rack disposed for lateral movement with respect to the vehicle, said rack including a housing;
   steering input means linked to said rack for providing lateral movement to said rack;
   a lateral shaft disposed for lateral movement with respect to said rack, said shaft including a piston disposed thereon and within said housing, said piston dividing said housing into first and second fluid chambers, said shaft having opposite ends linked to the steerable wheels of the vehicle;

fluid pressure source means in communication with said fluid chambers for providing fluid pressure to said fluid chambers, lateral movement of said rack being transferred to said shaft through the fluid pressure in said fluid chambers;

automatic steering control means for detecting an actual steering position of the vehicle and determining a desired steering position, said automatic steering control means comparing the actual steering position and the desired steering position to control communication between said fluid pressure source means and said fluid chambers to pressurize one fluid chamber with respect to the other fluid chamber and thereby cause said piston to move within said housing and further causing said shaft to move relative to said rack; and restraining means for restraining movement of at least one of said steering input means and said rack in relation to the vehicle when said automatic steering control means controls the communication between said fluid pressure source means and said fluid chambers.

13. The apparatus recited in claim 12 further comprising a fixed member secured to said vehicle, said steering input means including a main shaft and a steering wheel mounted thereon for rotating said main shaft therewith, said restraining means comprising a frame mounted on said fixed member, a rotating member mounted on said main shaft in opposed relationship with said frame for rotating together with said main shaft, electromagnetic means for engaging said rotating member with said frame.

14. The apparatus recited in claim 13, said electromagnetic means including a coil disposed on said frame, a movable plate axially movably mounted on said rotating member for rotating together therewith, and a friction member made of frictional material and secured to one of said frame and said movable plate in opposed relationship with the other one of said frame and said movable plate, and a linking member for movably linking said movable plate to said rotating member in the axial direction of said main shaft to rotate said movable plate together with said rotating member.

15. The apparatus recited in claim 14, the apparatus further comprising means for controlling electric current fed to said coil to maintain a desired value of the current.

16. The apparatus recited in claim 15, said automatic steering control means comprising a central processing unit, said means for controlling electric current comprising an electrically driven driver, said central processing unit actuating said fluid pressure source means and actuating said driver to activate said electromagnetic means.

17. The apparatus recited in claim 16, said driver comprising a voltage-duty converter connected to said central processing unit for receiving a voltage signal representing said desired value of the current and producing a pulse signal of a duty varied in accordance with said voltage signal, a current amplifier connected to said converter for feeding said coil with the current varied in proportion to the duty of said pulse signal, and a feed back circuit for connecting an output terminal of said coil to an input terminal of said converter.

18. The apparatus recited in claim 12, said pressure source means comprising a fluid circuit including a pump and a reservoir, said housing being linked in said fluid circuit between said pump and said reservoir, and further comprising a tri-positional valve disposed between said pump and said reservoir and said housing.

19. The apparatus recited in claim 18, said tri-positional valve comprising a solenoid valve having a first position in which one of said fluid chambers is in communication with said pump and the other one of said fluid chambers is in communication with said reservoir, a second position in which said other one of said fluid chambers is in communication with said pump and said one of said fluid chambers is in communication with said reservoir, and a third position in which both of said chambers are isolated from said pump and said reservoir.

* * * * *